(12) United States Patent
Mayerböck et al.

(10) Patent No.: US 6,622,996 B2
(45) Date of Patent: Sep. 23, 2003

(54) HYDRAULICALLY DAMPING RUBBER BEARING

(75) Inventors: Wilhelm Mayerböck, Bad Neuenahr (DE); Stephan Frisch, Köln (DE)

(73) Assignee: Mannesmann Boge GmbH, Bonn (DE)

( * ) Notice: Subject to any disclaimer, the term of this patent is extended or adjusted under 35 U.S.C. 154(b) by 0 days.

(21) Appl. No.: 09/977,592

(22) Filed: Oct. 15, 2001

(65) Prior Publication Data

US 2002/0060385 A1 May 23, 2002

(30) Foreign Application Priority Data

Nov. 17, 2000 (DE) .......................................... 100 57 191

(51) Int. Cl.⁷ ................................................. F16F 7/00
(52) U.S. Cl. ............................... 267/141.3; 267/140.11; 267/293; 280/124.13
(58) Field of Search ..................... 267/140.11, 140.12, 267/140.13, 140.14, 140.15, 141.2, 293, 141.7, 219, 141.3; 280/124.121, 124.13

(56) References Cited

U.S. PATENT DOCUMENTS

| | | | | |
|---|---|---|---|---|
| 4,741,521 A | * | 5/1988 | Schiffner et al. | 267/140.12 |
| 4,943,082 A | * | 7/1990 | Kijima et al. | 280/124.13 |
| 5,123,634 A | * | 6/1992 | Schwerdt | 267/140.12 |
| 5,123,635 A | * | 6/1992 | Bouhours | 267/140.14 |
| 5,156,380 A | * | 10/1992 | Cerruti et al. | 267/293 |
| 5,251,884 A | * | 10/1993 | Bouhier | 267/140.12 |
| 5,954,317 A | * | 9/1999 | Meyer et al. | 267/140.12 |
| 6,168,144 B1 | * | 1/2001 | Bruehl | 267/140.11 |
| 6,435,486 B2 | * | 8/2002 | Maier | 267/140.12 |

FOREIGN PATENT DOCUMENTS

| | | | | |
|---|---|---|---|---|
| DE | 3735698 | * | 3/1989 | F16F/13/00 |
| GB | 2 342 422 | | 4/2000 | |

* cited by examiner

*Primary Examiner*—Jack Lavinder
*Assistant Examiner*—Bejamin A Pezzlo
(74) *Attorney, Agent, or Firm*—Cohen, Pontani, Lieberman & Pavane

(57) ABSTRACT

Hydraulically damping rubber bearing consisting of an inner part, an outer part a certain distance concentrically or eccentrically outside the inner part, and a rubber part between the inner part and the outer part, in which rubber part at least one damping medium-filled chamber is provided. A certain distance concentrically inside the inner part, another tubular part is provided, part of the outside surface of this tubular part and part of the inside surface of the inner part being at least partially spherical, an elastic element being provided between these two spherical areas.

10 Claims, 2 Drawing Sheets

HYDRAULICALLY DAMPING RUBBER BEARING

BACKGROUND OF THE INVENTION

1. Field of the Invention

The invention pertains to a hydraulically damping rubber bearing consisting of an inner part, an outer part a certain distance concentrically or eccentrically outside the inner part, and a rubber part held between the other two parts, at least one damping medium-filled chamber being provided in the rubber part.

2. Description of the Related Art

Rubber bearings which consist of an inner part, an outer part a certain distance concentrically or eccentrically outside the inner part, and a rubber part between the other two parts, in which at least one damping medium-filled chamber is provided, are already known (e.g., GB 2 342 422). In this rubber bearing, the inner or outer part work together with a tubular component and an additional elastic rubber part to form an additional bearing, which works either in parallel or in series with the first bearing. In a rubber bearing of this type, each of the two individual rubber bearings has different tasks to fulfill; by fitting one of the bearings inside the other, a complete bearing assembly is created. Cylindrically designed hydraulic bearings as well as cylindrically designed rubber bearings allow only a limited degree of cardanic deflection. Any deflection angle beyond this leads necessarily to the destruction of the rubber bearing.

SUMMARY OF THE INVENTION

The object of the present invention is to develop a hydraulically damping rubber bearing in such a way that cardanic loads can be easily absorbed by the bearing.

According to the invention, an additional tubular part is provided a certain distance concentrically inside the inner part. A certain area of the outside surface of this tubular part is at least partially spherical, and a certain area of the inside surface of the inner part is also at least partially spherical. An elastic element is provided between these two spherical areas to form a rubber bearing.

It is advantageous that the different tasks of the bearing are divided, in that the hydraulically damping rubber bearing takes care of the hydraulic tasks, while the elastic element takes care of the cardanic loads, which hydraulically damping rubber bearings can handle to only a limited extent.

In accordance with another essential feature of the invention, it is provided that the elastic element has an approximately uniform wall thickness in cross section.

According to one design, it is provided that the additional tubular part can be cardanically deflected with respect to the inner part.

So that the rubber part can be mounted in the chassis of a motor vehicle, the outside surface of the additional tubular part is at least partially spherical, and a cylindrical bore passes axially through the center of the tubular part.

Another design provides that the cardanic deflection is absorbed by the elastic element.

Another embodiment provides that stops extending in the radial direction are provided between the inner part and the outer part. It is advantageous here not only that the stops are effective in the radial direction but also that they become effective even after small cardanic deflections. In accordance with another advantageous embodiment, it is provided that the rubber bearing is mounted vertically in the wheel suspension of a motor vehicle. The advantages here are that large cardanic deflections can thus be absorbed and that, via the hydraulically damping rubber bearing, the wheel oscillations can also be absorbed, so that the required durability is ensured.

According to another embodiment, it is provided that the rubber part and the elastic element can be made of different materials.

Another feature provides that the elastic element is tightly connected to the inner part and/or to the additional tubular part.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
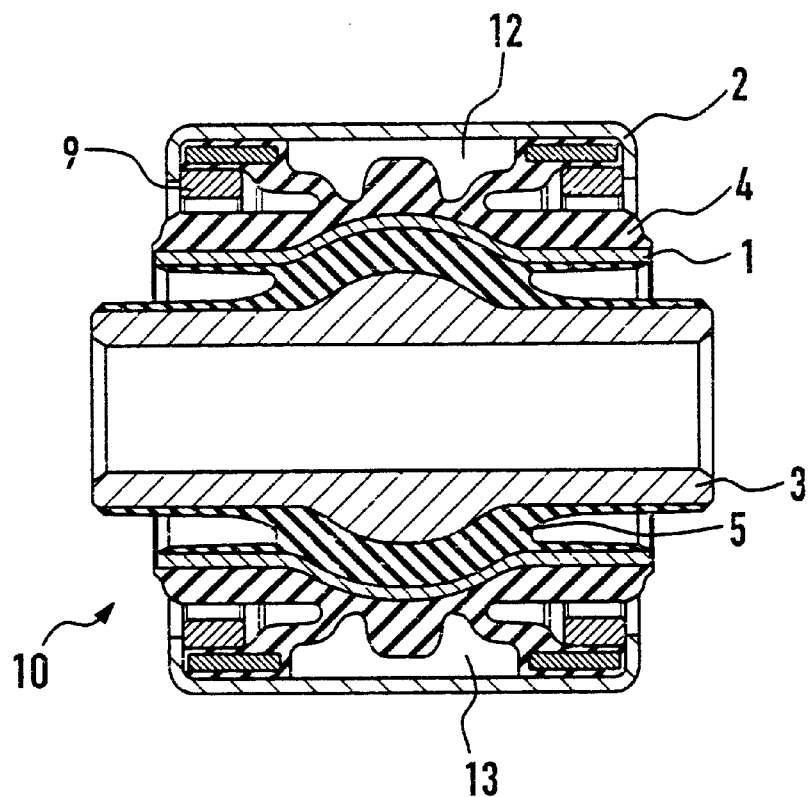
FIGS. 1 and 2 are orthogonal axial cross-sections of a rubber bearing.
Figure 2:
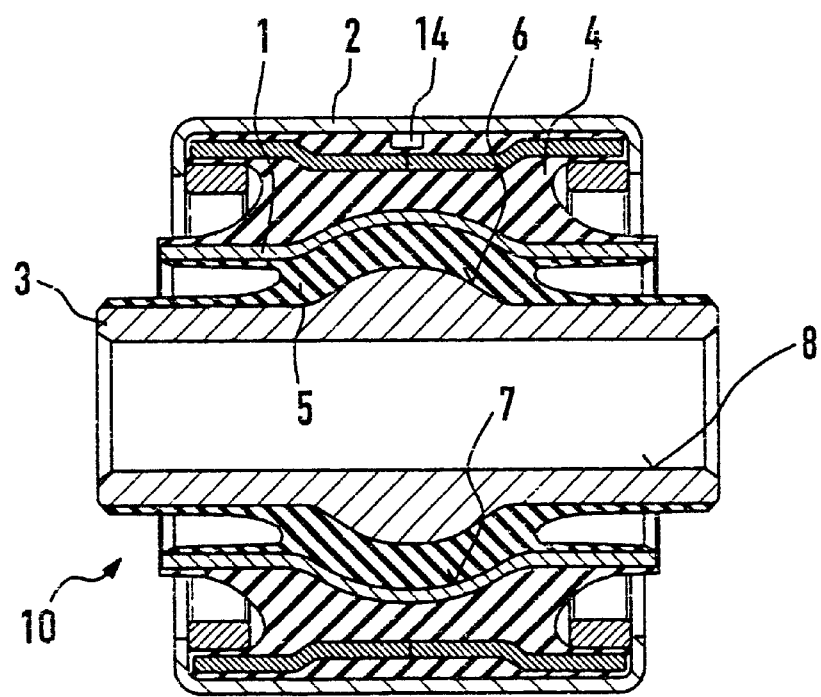

The rubber bearing shown in FIGS. 1 and 2 consists essentially of the inner tubular part 1, the outer tubular part 2, and a rubber part 4, located between the other two parts. Chambers 12, 13, which are filled with damping medium, are provided in the rubber part 4. These chambers exert a hydraulic damping effect in the axial direction, in that under certain conditions damping fluid flows from the chamber 12 via at least one damping channel 14 to the chamber 13 or vice versa. The external areas of the rubber part 4 facing in the axial direction are supported both on the inner part 1 and on the outer part 2, so that axial and radial movements can be executed, although cardanic movements can be absorbed to only a limited extent.

Between the inner part 1 and the additional tubular part 3, an elastic element 5 is provided, so that an additional conventional rubber bearing is formed in this area. So that cardanic movements can be executed easily, the outside surface of the additional tubular part 3 is crowned or spherical, whereas the inside surface 7 of the inner part 1 is also crowned or in the form of a hollow sphere, so that the elastic element 5 held between them has an approximately uniform wall thickness when seen axially along its length. As a result of this geometric design, it is easy for the additional tubular element 3, which can be mounted in the chassis by its central bore 8, to be cardanically deflected with respect to the inner part 3.

The rubber bearing 10 in the hydraulically damping rubber bearing is also provided with stops 9 between the outer part 2 and the rubber part 4 to give support in the case of radial deflections. Although it also allows the inner part 1 to execute cardanic movement, it does so only within a certain limited angular range.

Figure 3:
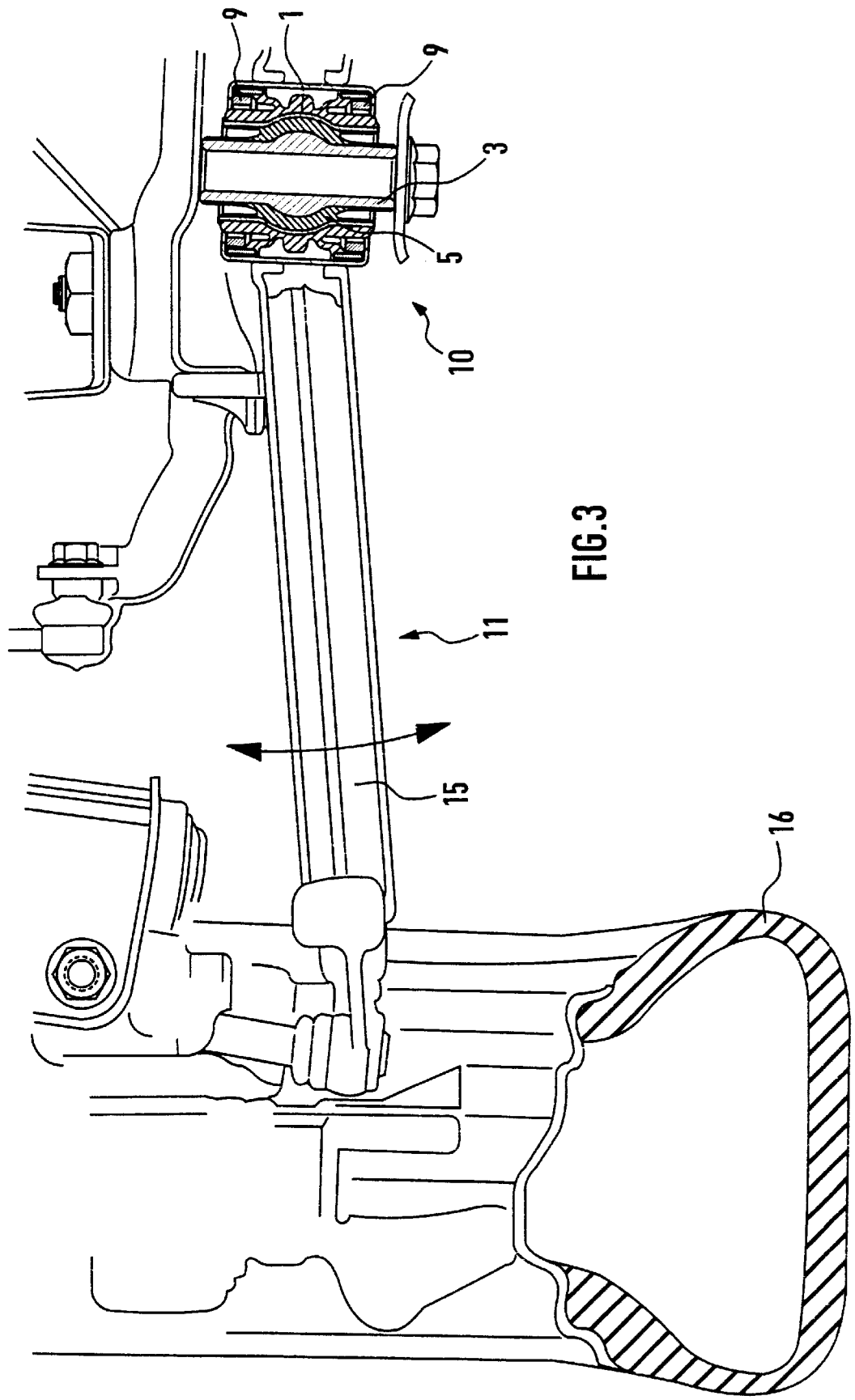
FIG. 3 shows a rubber bearing as installed on the chassis of a motor vehicle.

FIG. 3 shows a rubber bearing 10 as it would appear after installation in the chassis of a motor vehicle; as can be seen, the rubber bearing 10 is approximately perpendicular to the road. Oscillations of the rods 15, caused by the wheel 16 of the motor vehicle, lead to cardanic deflections at the rubber bearing 10, which in this case can be easily absorbed by the inner part 1, the elastic element 5, and the additional tubular part 3.

The actual hydraulically damping part of the rubber bearing serves to damp excitations in a certain direction, and when the hydraulically damping rubber bearing is mounted vertically, it is required to absorb only a limited degree of cardanic deflection. As a result of the appropriate design of the stops 9, the elastic element 5 alone will absorb any cardanic deflections exceeding this limited angle without suffering any ill effects.

By separating the bearings from each other, it is possible for the rubber bearing 10 to be made of two different materials, which means that two different grades of rubber (rubber part 4, elastic element 5) can be processed in a single vulcanization cycle.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A hydraulically damping rubber bearing comprising
    an inner tubular part having an inside surface with a concave area,
    an outer tubular part spaced one of concentrically and eccentrically outside said inner part,
    a rubber part held between said inner part and said outer part, said rubber part having therein a chamber which is filled with a damping medium,
    an additional tubular part spaced concentrically inside said inner tubular part, said additional tubular part having an outside surface with a convex area, and
    an elastic element arranged between said convex area of said outside surface of said additional tubular part and said concave area of said inside surface of said inner tubular part.

2. A rubber bearing as in claim 1 wherein said concave area is an at least partially spherical area, and said convex area is an at least partially spherical area.

3. A rubber bearing as in claim 1 wherein said elastic element has a substantially uniform thickness between said convex area and said concave area.

4. A rubber bearing as in claim 1 wherein said additional tubular part can be cardanically deflected with respect to said inner tubular part.

5. A rubber bearing as in claim 4 wherein said cardanic deflection is absorbed by said elastic element.

6. A rubber bearing as in claim 1 wherein said additional tubular part has a cylindrical center bore.

7. A rubber bearing as in claim 1 further comprising stops acting in the radial direction between the inner tubular part and the outer tubular part.

8. A rubber bearing as in claim 1 wherein the rubber part and the elastic element are made of different materials.

9. A rubber bearing as in claim 1 wherein the elastic element is bonded to at least one of the inner tubular part and the additional tubular part.

10. A wheel suspension of a motor vehicle comprising a vertically mounted rubber bearing, said rubber bearing comprising
    an inner tubular part having an inside surface with a concave area,
    an outer tubular part spaced one of concentrically and eccentrically outside said inner part,
    a rubber part held between said inner part and said outer part, said rubber part having therein a chamber which is filled with a damping medium,
    an additional tubular part spaced concentrically inside said inner tubular part, said additional tubular part having an outside surface with a convex area, and
    an elastic element arranged between said convex area of said outside surface of said additional tubular part and said concave area of said inside surface of said inner tubular part.

* * * * *